US006961796B2

(12) United States Patent
Ang

(10) Patent No.: US 6,961,796 B2
(45) Date of Patent: Nov. 1, 2005

(54) EXTENDABLE BUS INTERFACE

(75) Inventor: Boon Seong Ang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 544 days.

(21) Appl. No.: 09/915,510

(22) Filed: Jul. 26, 2001

(65) Prior Publication Data

US 2004/0225819 A1 Nov. 11, 2004

(51) Int. Cl.[7] .......... G06F 13/14

(52) U.S. Cl. .......... 710/305; 710/29; 710/31; 710/33; 710/36

(58) Field of Search .......... 710/305, 1, 29, 710/31, 33, 36; 711/209; 713/500; 703/20; 700/55

(56) References Cited

U.S. PATENT DOCUMENTS 4,268,902 A * 5/1981 Berglund et al. .......... 710/305
4,831,520 A * 5/1989 Rubinfeld et al. .......... 710/305
5,136,580 A * 8/1992 Videlock et al. .......... 370/403
5,560,001 A * 9/1996 Kardach et al. .......... 713/500
5,692,138 A * 11/1997 Fandrich et al. .......... 710/305
5,729,755 A * 3/1998 Turski .......... 710/305
5,734,872 A * 3/1998 Kelly .......... 703/20
6,487,626 B2 * 11/2002 Gray et al. .......... 710/305
6,513,105 B1 * 1/2003 Pontius .......... 711/209
6,708,069 B2 * 3/2004 Ohashi et al. .......... 700/55

* cited by examiner

*Primary Examiner*—Tim Vo
*Assistant Examiner*—Justin King

(57) ABSTRACT

A bus interface circuit arrangement and method. In various embodiments, a bus interface circuit arrangement interfaces with a bus functioning in accordance with a bus protocol. The bus interface circuit arrangement includes a bus interface circuit having a port arranged to be coupled to the bus. The bus interface circuit provides physical and link layers of the bus protocol. A bus processing block, implemented with a programmable device, is coupled to the bus interface circuit and is configured to perform selected processing in response to selected bus messages. A filter circuit, also implemented with a programmable device, is coupled to the bus interface circuit and to the bus processing block. The filter circuit is configured to direct bus messages to a selected one of the bus interface circuit and the bus processing block responsive to a code in the bus message.

23 Claims, 2 Drawing Sheets

EXTENDABLE BUS INTERFACE

FIELD OF THE INVENTION

The present invention generally relates to buses for microprocessors, and more particularly to interface circuitry for connecting a microprocessor to a bus.

BACKGROUND

Bus protocols can be described in terms of layers, each layer managing a particular aspect of bus operation. Bus protocols have well-defined physical, link, and semantics layers. The physical layer is the lowest layer and manages physical issues such as voltage, current, and timing of signals. The link layer is above the physical layer and coordinates the handshakes for individual bus operations. Specifically, the link layer coordinates the signal sequence for requesting to use the bus, indicating the start of a bus operation, monitoring responses from other devices, and completing the bus operations. The semantics layer is generally limited to controlling memory access and cache-coherence.

Current microprocessor bus interface units generally handle only the physical and link layers, and part of the semantic layers. The functionality of the semantics layer implemented in the bus interface unit includes, for example, observing operations on the bus, forwarding information from selected bus operations to other blocks in the microprocessor arrangement, such as an L2 cache and translation look-aside buffer (TLB) as appropriate, for further implementation-specific semantic actions such as a cache or TLB entry invalidation action.

Many microprocessor bus interface units are hardwired and support a limited, fixed set of functions. Given the high cost of developing specialized microprocessors, a small number of general purpose microprocessors are used in implementing many types of systems. In certain systems and for certain applications, however, the functionality and performance may be enhanced with specialized bus interface units. For example, the cache invalidation technique implemented in the semantics layer may be customized to improve performance. Unfortunately, customizing a microprocessor for a particular application is often unfeasible because of the high cost of customizing hardwired logic and the long development cycle, for example.

A system and method that address the aforementioned problems, as well as other related problems, are therefore desirable.

SUMMARY OF THE INVENTION

A bus interface circuit arrangement and method are provided in various embodiments of the invention. The bus interface circuit arrangement includes a bus interface circuit having a port arranged to be coupled to the bus. The bus interface circuit provides physical and link layers of the bus protocol. A bus processing block, implemented with a programmable device, is coupled to the bus interface circuit and is configured to perform selected processing in response to selected bus messages. A filter circuit, also implemented with a programmable device, is coupled to the bus interface circuit and to the bus processing block. The filter circuit is configured to direct bus messages to a selected one of the bus interface circuit and the bus processing block responsive to a code in the bus message.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
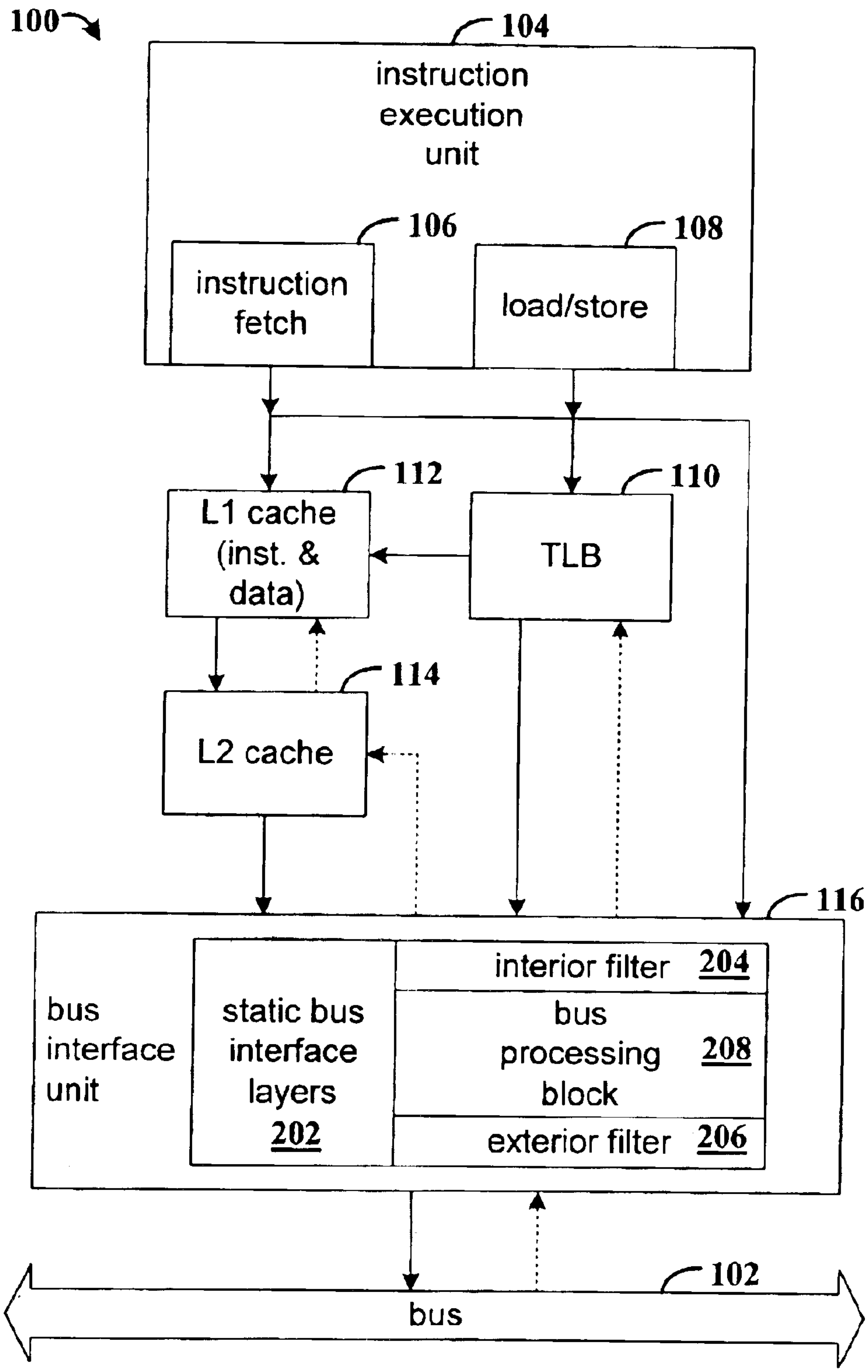
FIG. 1 is a functional block diagram of selected components of a microprocessor coupled to a bus in accordance with one embodiment of the invention.

The present invention provides an efficient and reconfigurable/programmable arrangement for selectively performing customized processing on microprocessor bus operations and/or internal memory operations. Internal memory operations refer to operations initiated from within the microprocessor. In various embodiments, the invention includes a reconfigurable/programmable bus interface circuit arrangement ("bus interface") for interfacing a microprocessor with a bus. The reconfigurable/programmable characteristic of the bus interface is referred to herein as "programmable" for brevity. In addition to circuitry that provides the physical and link layers of the bus interface, the bus interface includes a programmable filter that selects certain bus operations and/or memory operations for special processing by the bus interface. The bus operations and memory operations are referred to as bus messages in this description. The bus messages selected by the programmable filter are processed by a programmable bus processing block in the bus interface. The processing block in the bus interface is customizable to perform operations that are implementation-specific to a particular system. For example, the processing block can be tailored to perform selected cache coherence functions in a special way beneficial to the specific system in which it is employed.

In another embodiment, the bus interface includes two programmable filters, one at the bus side of the interface ("exterior filter") and the other at the microprocessor side of the interface ("interior filter"). The filters ensure that the processing block in the bus interface is not burdened with operations for which customized processing is not desired and that these operations proceed at hardwired speed as in implementations without a programmable processing block.

The processing block has a dedicated memory block, and in another embodiment, a dedicated content-addressable memory (CAM). Depending on the system requirements, the memories may be used for both internal bookkeeping by the processing block, as well as memory for the overall system. In the latter usage, the memory is accessible from programs running on the system's microprocessors. Depending on the system requirements, the processing block can also initiate access to external memory and access to the caches and TLB within the local microprocessor.

The exterior filter supports the capability of the processing block to supply data in response to a bus message (also referred to as a "bus transaction") that is initiated by another device on the bus. Thus, the processing block of the bus interface can act as a bus slave without interruption of the local microprocessor.

Since the processing block operates independently of the local microprocessor, functions formerly implemented on the microprocessor that are invoked by interrupting the microprocessor can instead be implemented on the processing block of the bus interface. These functions can then be invoked without interrupting the microprocessor to improve performance, since processor interrupts consume a significant number of processor cycles. By reducing the cost of each invocation, the frequency of the invocations may be increased without significantly degrading system performance, depending on the particular operation.

The processing block is also configurable to continuously monitor bus traffic and take selected programmed actions. Prior bus monitoring arrangements involved significant software overhead (due to interrupts) or use of an external bus device. Because the bus interface circuit arrangement is programmable, the possible set of functions that can be implemented is vast.

FIG. 1 is a functional block diagram of selected components of a microprocessor coupled to a bus in accordance with one embodiment of the invention. The solid directional lines illustrate the flow of memory access requests initiated from within the microprocessor, and the dashed directional lines illustrate the flow actions initiated within the microprocessor 100 in response to operations appearing on bus 102.

Memory accesses are initiated from software that executes on instruction execution unit 104 either implicitly in the form of fetching an instruction via instruction fetch unit 106 or explicitly during execution of a load/store-type instruction and support from load/store unit 108. Some microprocessors also support a range of other load/store type instructions that are related to cache coherency and cache manipulation, for example, flushing a cache-line, or invalidating a translation look-aside buffer (TLB) 110 entry.

Most memory requests reference cacheable pages, and the instruction fetch unit 106 and load/store unit 108 first attempt to find a referenced address in the level-one (L1) cache 112. If the referenced address is not in the L1 cache, the L1 cache directs the request to the level-2 (L2) cache 114. It will be appreciated that some microprocessors have none of or only a part of the L2 cache on the same chip as the L1 cache, and that the present invention is not limited to microprocessors having on-chip L2 cache. It will also be appreciated that instructions may be kept in an L1 cache that is separate from an L1 cache for general data, even though the L1 cache 112 is illustrated as a single block. The same holds true for the L2 cache 114.

Memory access requests are also directed from the instruction fetch unit 106 and load/store unit 108 to the TLB 110. The TLB maps virtual addresses to physical addresses. Since most microprocessors support virtual memory addressing by software and a physical addresses are needed to access external memory, the TLB provides the translation of the virtual addresses to physical addresses. In many microprocessors, a physical address is also needed for cache access, as indicated by the arrow in the above figure from the TLB to the L1 cache.

The bus interface unit (BIU) 116 is the entity in the microprocessor that interposes between other parts of the microprocessor and the (external) microprocessor bus. The direct connections from the instruction fetch unit 106 and the load/store unit 108 to the BIU 116 are for memory access requests referencing uncached memory addresses. Whether an address referenced in a request is uncached, cached write-back, or cached write-through depends on the address, and this information is obtained from the TLB 110. The TLB also has a connection to the BIU for TLB-miss processing, assuming there is hardware support for TLB miss handling. It will be appreciated that TLB miss handling may be implemented in software, as in the MIPS® processors, or implemented in hardware as in the PowerPC® processors.

As indicated above, the dashed, directional lines indicate external bus operations that result in actions within the microprocessor 100, and more specifically, actions in support of cache-coherence protocols. The BIU 116 observes bus operations and forwards relevant ones to the L2 cache 114 and the TLB 110 for appropriate actions, invalidating matching entries, for example. The L2 cache may further propagate the information up to the L1 cache 112 for similar invalidations. This function of the BIU is commonly known as snooping.

The present invention enables post-fabrication extension/programmability in the microprocessor's BIU 116 at the semantics layer. It is impractical to make the lower layers, physical and link layers, extendable after fabrication without suffering a performance penalty in the bus clock speed, which in year 2001 is over 200 MHz in some systems. Bus interface unit 116 includes static bus interface layers 202 that provide a direct wired interface between the instruction execution unit 104 and the cache units and the bus 102. In addition, the bus interface unit includes interior filter 204 and exterior filter 206 for selectively directing bus messages to bus processing block 208. The bus processing block performs application-specific processing on bus messages. In one embodiment, the interior and exterior filters and bus processing block are implemented in programmable logic, thereby enabling post-fabrication extendibility and programmability at the semantics layer.

Figure 2:
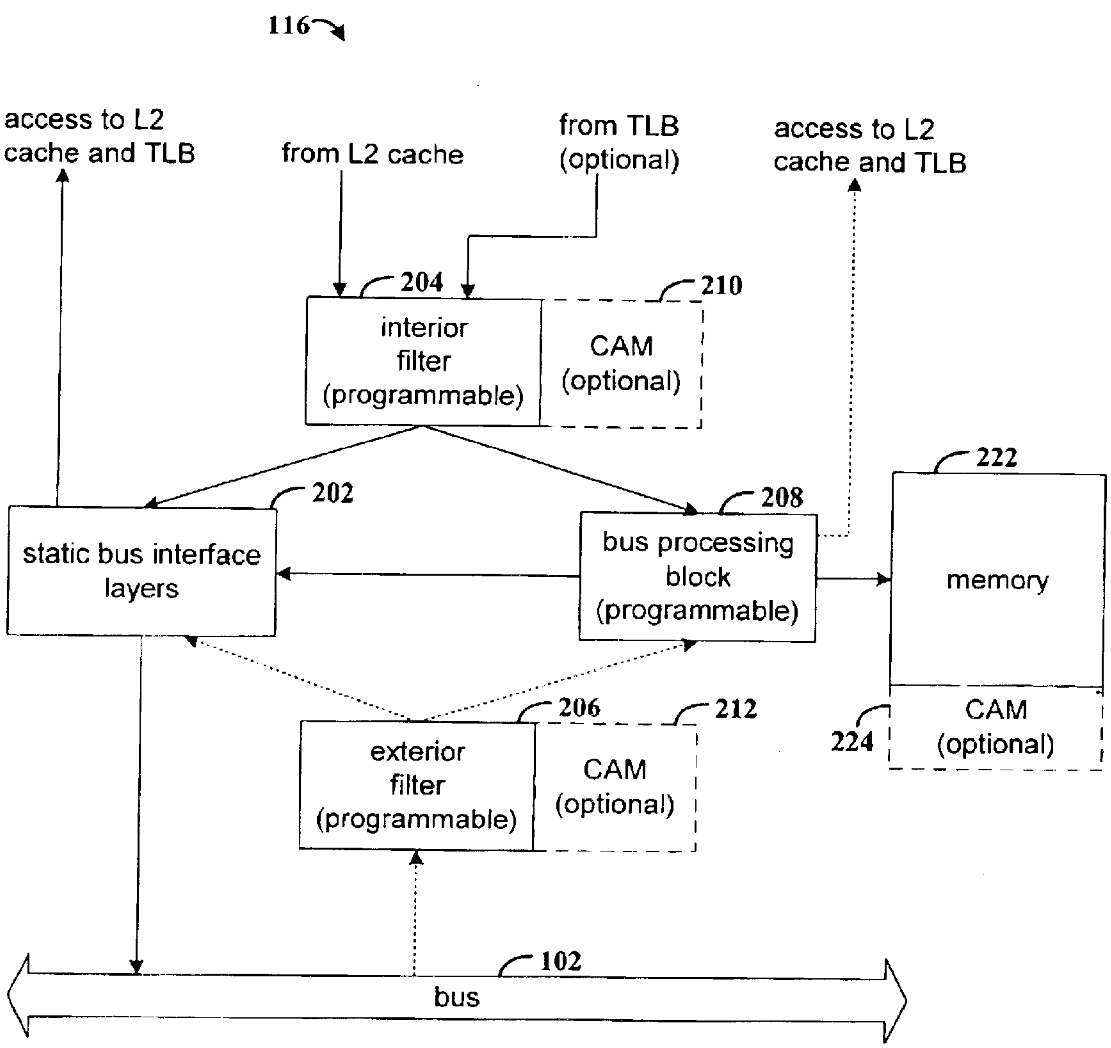
FIG. 2 is a functional block diagram of a bus interface unit in accordance with another embodiment of the invention.

FIG. 2 is a functional block diagram of a bus interface unit in accordance with another embodiment of the invention. Along with the static bus interface layers 202, BIU 116 includes a programmable interior filter 204, a programmable exterior filter 206, and a programmable bus processing block 208. While both interior filter 204 and exterior filter 206 are illustrated as part of BIU 116, it will be appreciated that in other embodiments, a BIU includes only interior filter 204 or only exterior filter 206, depending on system requirements.

Interior filter 204 processes bus messages from other units of the microprocessor in accordance with one of the embodiments described below. The interior filter 204, receives bus-bound bus messages from the microprocessor and applies a programmable filter function. In one embodiment, the programmable filter 204 selects which bus messages are to be processed in the static bus interface layers 202 and which bus messages are to be processed by the bus processing block 208. The bus messages are then routed to the static bus interface layers 202 and bus processing block 208 accordingly.

In another embodiment, selected bus messages are directed to the static bus interface layers for processing, and notifications of the bus messages are sent to the bus processing block for informational purposes. The notification includes information that describes the bus message, for example, the bus message type, the referenced address, and the data involved. The bus processing block is programmed to ignore unneeded information in the notification. It will be appreciated that in other embodiments, different subsets of the bus message information are included in the notification to the bus processing block. Still other embodiments control the time at which the notification is sent to the bus processing block, for example, waiting until the bus message has successfully completed on the bus 102 or transmitting the notification before the bus message is transmitted on the bus.

The programmability of the interior filter 204 allows different categories of bus messages to be defined, based on the type of operation and the address range, for example. The bus processing block is programmed to take appropriate actions for the different categories of bus messages. In one embodiment, a ternary content addressable memory (CAM) 210 is coupled to the interior filter for categorizing bus messages based on address ranges. In other embodiments, the CAM includes bus message types or entries with combinations of addresses and message types. A ternary CAM allows not only logic values "0" or "1" to be specified as matching criteria for bits, but also "don't-care" bits. Each internally initiated request is looked up in the ternary CAM to find a match. If a match is found, the content of the matching entry specifies the desired action. Each entry in a typical CAM actually has two parts. One part can be thought of as the "key" and another part the "data". Searches are performed against the keys of the various entries. When a match is found, the CAM provides an indication that a match was found and further supplies the data associated with the matching entry. By default, no match means forwarding the request to the bus interface layers 202 only.

In another embodiment, the interior filter 204 references the TLB 110 (FIG. 1). This occurs as an additional function during the TLB lookup for virtual-to-physical address translation. TLB 110 includes a specification of an action associated with a page/block referenced in a request. For example, the possible actions include forwarding the request to the bus processing block 208, sending a "notification" to the bus processing block, or performing no special action. One or more fields in the TLB are used for the action, depending on the implementation requirements. In this embodiment, every memory access instruction is checked and potentially triggers action in the bus processing block 208 based on the address. Having the operation serviced by the bus processing block is equivalent to treating the access request as an operation on uncached data, which bypasses the cache.

Another embodiment implements a hybrid of the above two methods, with the TLB providing action information, that is further qualified by cache-hit/cache-miss information when an access is looked up in the L1 and/or L2 cache.

The exterior filter 206 is programmable, and processes external bus messages (those appearing on bus 102). Based on the information in each bus message (e.g., the bus operation type, address and possibly the identity of the initiator), the exterior filter determines whether to direct the message to the bus interface layers 202, direct the message to the bus processing block 208, or forward the message to the bus interface layers and notify the bus processing block. As with the interior filter 204, the exterior filter is coupled to a ternary CAM 212 in an alternative embodiment.

In one embodiment, exterior filter 206 is configured to work in conjunction with bus processing block 208 to supply data in response to a bus message. Some link level bus protocols impose tight timing constraints on the time in which data must be supplied relative to the time the bus operation was issued. In order to meet timing constraint, the requester may need to retry the bus operation while the bus processing block 208 determines which data to return. The exterior filter places the data into a small cache (not shown). When the bus operation is retried, the exterior filter, finding a match in the cache, supplies data from the cache.

Bus processing block 208 is the main processing unit of the programmable bus interface unit 116. The bus processing block implements application-specific logic. In various alternative embodiments, the bus processing block is implemented on a field programmable gate array (FPGA) or microcode engine, for example. Depending on systems requirement, the bus processing block may also be implemented with one-time programmable technology, such as laser programmable gate array (LPGA) or programmable devices employing fuses or anti-fuses.

The bus processing block queues bus messages (or notifications) that are forwarded from the filters (204, 206). In one embodiment, the bus processing block processes multiple operation concurrently with multiple microcode engines, or alternatively, through appropriate structuring of the logic implemented in the FPGA. The processing block is coupled to a local RAM 222, and the RAM is used as a scratch pad or for storing book-keeping information. In another embodiment, the bus processing block is also coupled to a CAM 224 for efficiently implementing a level of cache.

In a specific example implementation of bus processing block 208, the processing block initiates an external bus operation by making such a request to the bus interface layers 202. The bus processing block also requests snoop action by the L2 cache, and the TLB similar to the bus interface layers. Furthermore, some implementations may find it beneficial to allow the bus processing block to use the TLB 110 for translating virtual to physical addresses and to use the L2 cache for general memory load/store accesses.

It will be appreciated that action by the bus processing block 208 is triggered either from within the microprocessor (via the interior filter) or from external bus operations. Furthermore, the behavior is programmable and the logic runs independently of the software running on the microprocessor.

What is claimed is:

1. A circuit arrangement for interfacing a first circuit arrangement with a bus functioning in accordance with a bus protocol, comprising:

a bus interface circuit having a port arranged to be coupled to the bus, the bus interface circuit providing physical and link layers of the bus protocol;

a bus processing block coupled to the bus interface circuit, the bus processing block implemented with a first programmable device and configured to perform selected processing in response to selected bus messages; and a filter circuit coupled to the bus interface circuit and to the bus processing block, the filter circuit implemented with a second programmable device and configured to direct bus messages to a selected one of the bus interface circuit and the bus processing block.

2. The circuit arrangement of claim 1, wherein the filter circuit is further configured to direct bus messages to a selected one of the bus interface circuit and the bus processing block in response to at least one of a bus operation code, an address, and initiator identification code in each of the bus messages.

3. The circuit arrangement of claim 1, wherein the filter circuit includes an interior filter circuit coupled to the bus interface circuit and to the bus processing block, the interior filter circuit configured to direct bus messages received from the first circuit arrangement to a selected one of the bus interface circuit and the bus processing block.

4. The circuit arrangement of claim 3, wherein the interior filter circuit is further configured to provide the bus processing block with notification data for selected messages sent to the bus interface circuit.

5. The circuit arrangement of claim 3, wherein the first circuit arrangement includes a cache and a translation look-aside buffer (TLB) that maps virtual addresses to physical addresses of data stored in the cache, the TLB further including a flag with a selected value for selected areas of memory, and the interior filter circuit is coupled to the TLB and further configured to direct selected bus messages to the bus processing block responsive to the value of the flag in the TLB.

6. The circuit arrangement of claim 3, wherein the first circuit arrangement includes a cache and a translation look-aside buffer (TLB) that maps virtual addresses to physical addresses of data stored in the cache, the TLB further including a flag with a selected value for selected areas of memory, and the interior filter circuit is coupled to the TLB and further configured to provide the bus processing block with notification data for selected messages sent to the bus interface circuit responsive to the value of the flag in the TLB.

7. The circuit arrangement of claim 3, wherein the interior filter circuit includes a ternary content addressable memory (CAM) configured with values representing selected address ranges, and the interior filter circuit is further configured to direct bus messages received from the first circuit arrangement to a selected one of the bus interface circuit and the bus processing block responsive to addresses in the bus messages matching address ranges in the CAM.

8. The circuit arrangement of claim 3, wherein the interior filter circuit includes a ternary content addressable memory (CAM) configured with values representing selected bus message types, and the interior filter circuit is further configured to direct bus messages received from the first circuit arrangement to a selected one of the bus interface circuit and the bus processing block responsive to message types of the bus messages matching values in the CAM.

9. The circuit arrangement of claim 3, wherein the interior filter circuit includes a ternary content addressable memory (CAM) configured with values representing selected address ranges and bus message types, and the interior filter circuit is further configured to direct bus messages received from the first circuit arrangement to a selected one of the bus interface circuit and the bus processing block responsive to addresses and message types of the bus messages matching address ranges and values in the CAM.

10. The circuit arrangement of claim 3, wherein the filter circuit includes an exterior filter circuit coupled to the bus interface circuit and to the bus processing block, the exterior filter circuit configured to direct bus messages received from the bus to a selected one of the bus interface circuit and the bus processing block.

11. The circuit arrangement of claim 1, wherein the filter circuit includes an exterior filter circuit coupled to the bus interface circuit and to the bus processing block, the exterior filter circuit configured to direct bus messages received from the bus to a selected one of the bus interface circuit and the bus processing block.

12. The circuit arrangement of claim 11, wherein the exterior filter circuit includes a ternary content addressable memory (CAM) configured with values representing selected address ranges, and the exterior filter circuit is further configured to direct bus messages received via the bus to a selected one of the bus interface circuit and the bus processing block responsive to addresses in the bus messages matching address ranges in the CAM.

13. The circuit arrangement of claim 11, wherein the exterior filter circuit includes a ternary content addressable memory (CAM) configured with values representing selected message types, and the exterior filter circuit is further configured to direct bus messages received via the bus to a selected one of the bus interface circuit and the bus processing block responsive to message types of the bus messages matching values in the CAM.

14. The circuit arrangement of claim 11, wherein the exterior filter circuit includes a ternary content addressable memory (CAM) configured with values representing selected address ranges and message types, and the exterior filter circuit is further configured to direct bus messages received via the bus to a selected one of the bus interface circuit and the bus processing block responsive to addresses and message types of the bus messages matching address ranges and message types in the CAM.

15. The circuit arrangement of claim 1, wherein at least one of the first programmable device and the second programmable device is a programmable logic device.

16. The circuit arrangement of claim 1, wherein at least one of the first programmable device and the second programmable device is a field programmable gate array.

17. The circuit arrangement of claim 1, wherein at least one of the first programmable device and the second programmable device is a microcode engine.

18. The circuit arrangement of claim 1, wherein the bus processing block is configured to receive bus messages from the bus without interruption of the first circuit arrangement.

19. The circuit arrangement of claim 1, further comprising a RAM coupled to the bus processing block.

20. The circuit arrangement of claim 1, wherein the bus processing block is configured to initiate transmission of bus messages over the bus via the bus interface circuit.

21. A method for interfacing a first circuit with a bus via an interface arrangement in accordance with a bus protocol, the interface arrangement including a bus interface circuit and a bus processing block, comprising:

receiving at the interface arrangement outgoing bus messages from the first circuit and receiving incoming bus messages from the bus;

selecting a first class of bus messages for processing by the bus processing block and selecting a second class of bus messages for processing by the bus interface circuit;

processing the first class of bus messages at the bus processing block, directing outgoing bus messages in the first class from the bus processing block to the bus interface circuit, and directing incoming bus messages in the first class to the first circuit; and processing bus messages of the second class at the bus interface circuit in accordance with physical and link layers of the bus protocol.

22. The method of claim 21, wherein the interface arrangement further includes a programmable filter, further comprising configuring the programmable filter for selecting the first and second classes of messages.

23. An apparatus for interfacing a first circuit with a bus via an interface arrangement in accordance with a bus protocol, the interface arrangement including a bus interface circuit and a bus processing block, comprising:

means for receiving at the interface arrangement outgoing bus messages from the first circuit and receiving incoming bus messages from the bus;

means for selecting a first class of bus messages for processing by the bus processing block and selecting a second class of bus messages for processing by the bus interface circuit;

means for processing the first class of bus messages at the bus processing block, directing outgoing bus messages in the first class from the bus processing block to the bus interface circuit, and directing incoming bus messages in the first class to the first circuit; and means for processing bus messages of the second class at the bus interface circuit in accordance with physical and link layers of the bus protocol.

* * * * *